United States Patent
Hess et al.

(10) Patent No.: US 9,678,821 B2
(45) Date of Patent: *Jun. 13, 2017

(54) OPERATING A TRACE PROCEDURE FOR A COMPUTER PROGRAM

(71) Applicant: INTERNATIONAL BUSINESS MACHINES CORPORATION, Armonk, NY (US)

(72) Inventors: Thomas Hess, Bad Liebenzell (DE); Martin Raitza, Boeblingen (DE); Ralf Richter, Unterhausen (DE); Philip Sebastian Schulz, Boeblingen (DE); Markus K. Strasser, Metzingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/705,208

(22) Filed: May 6, 2015

(65) Prior Publication Data

US 2016/0328311 A1 Nov. 10, 2016

(51) Int. Cl.
- *G06F 9/44* (2006.01)
- *G06F 11/07* (2006.01)
- *G06F 11/36* (2006.01)

(52) U.S. Cl.
CPC ........ *G06F 11/0778* (2013.01); *G06F 11/079* (2013.01); *G06F 11/0787* (2013.01); *G06F 11/3612* (2013.01); *G06F 11/3636* (2013.01)

(58) Field of Classification Search
CPC ......... G06F 11/07; G06F 11/3636; G06F 9/44
See application file for complete search history.

(56) References Cited

U.S. PATENT DOCUMENTS 8,108,839 B2    1/2012   Clark
8,271,956 B2    9/2012   Howland et al.
(Continued)

OTHER PUBLICATIONS

Katiyar et al., "Logging in Multi-Threaded Applications Efficiently with Ring Buffer", IBM developerWorks, http://www.ibm.com/developerworks/aix/library/au-buffer, published Aug. 17, 2007 (6 pages).

(Continued)

*Primary Examiner* — Li B Zhen
*Assistant Examiner* — Mohammad Kabir
(74) *Attorney, Agent, or Firm* — William A. Kinnaman, Esq.; Kevin P. Radigan, Esq.; Heslin Rothenberg Farley & Mesiti P.C.

(57) ABSTRACT

A method is provided for operating a trace procedure, which traces execution of a computer program, where the program uses different callable modules. A program stack is used to store trace buffer information and an error state, and the modules include calls of the trace procedure. The method includes: (i) when entering execution of a module, storing the current write position of the trace buffer and a cleared error flag in the current frame of the stack; (ii) in case of an error condition during execution of the program, setting the error flag in the current frame; and (iii) when leaving execution of a module, determining if the error flag is set, and if not, then rewinding the trace buffer to the write position stored in the current frame, and deleting the current write position of the trace buffer and the error flag from the stack.

10 Claims, 11 Drawing Sheets

(56) References Cited

U.S. PATENT DOCUMENTS

| | | |
|---|---|---|
| 8,453,121 B2 | 5/2013 | Birkill et al. |
| 8,484,517 B2 | 7/2013 | Mayer |
| 8,799,719 B2 | 8/2014 | Shazly |
| 2007/0207800 A1* | 9/2007 | Daley ................. H04L 12/2602 455/425 |
| 2008/0134148 A1* | 6/2008 | Clark .................. G06F 11/3636 717/128 |
| 2011/0307737 A1* | 12/2011 | Uchino ............... G06F 11/3055 714/15 |
| 2012/0284698 A1* | 11/2012 | Brunkhorst ........... G06F 11/362 717/128 |
| 2014/0215444 A1 | 7/2014 | Voccio et al. |

OTHER PUBLICATIONS

Hess, Thomas, "Operating a Trace Procedure for a Computer Program", U.S. Appl. No. 14/922,304, filed Oct. 26, 2015 (33 pages).

Hess, Thomas, "Listing of IBM Patents and/or Patent Applications Treated as Related", U.S. Appl. No. 14/705,208, filed May 6, 2015, dated Mar. 8, 2016 (2 pages).

Hess, et al., Office Action for U.S. Appl. No. 14/922,304, filed Oct. 26, 2015 (U.S. Patent Publication No. 2016/0328283 A1), dated Jan. 26, 2017 (31 pages).

\* cited by examiner

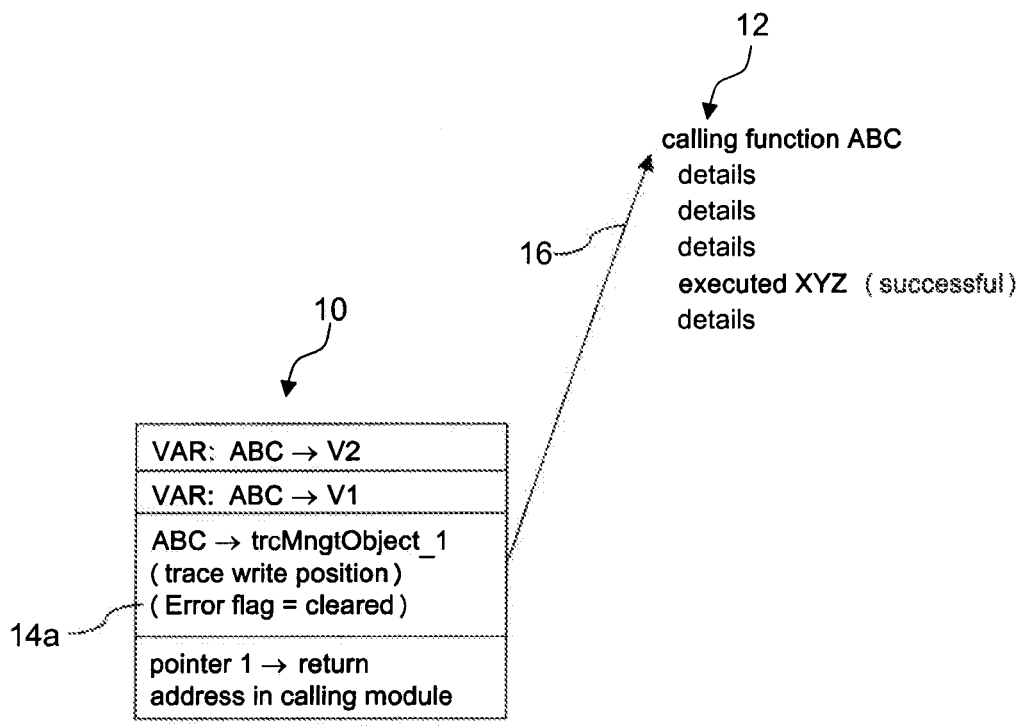

```
function ABC ()
{
    TraceObject trcMngtObject_1;
    var V1;
    var V2;
    ...
    call function XYZ;
    ...
}
command;
```

```
function ABC ()
{
    TraceObject trcMngtObject_1;
    var V1;
    var V2;
    ...
    call function XYZ;
    ...
}
function XYZ ()
{
    TraceObject trcMngtObject_2;
    var VA;
    var VB;
    ...
    some code
}
```

```
function ABC ()
{
    TraceObject trcMngtObject_1;
    var V1;
    var V2;
    ...
    call function XYZ;
    ...
}
function XYZ ()
{
    TraceObject trcMngtObject_2;
    var VA;
    var VB;
    Error
    some code
}
```

18 → Error

```
function ABC ()
{
    TraceObject trcMngtObject_1;
    var V1;
    var V2;
    ...
    call function XYZ;
    (returned error)
    ...
}
```

OPERATING A TRACE PROCEDURE FOR A COMPUTER PROGRAM

BACKGROUND

The present invention relates in general to data processing systems, and in particular, to a method, system and computer program product for operating a trace procedure, which traces execution of a computer program in a trace buffer.

Tracing is used in computer programs to log the program execution flow. This is important if failures have to be analyzed in a "post mortem" scenario. Tracing can also be used in a production environment for problem determination. In the production environment, a problem may occur with the code (e.g. code paths, code path sequences that were abnormal or unexpected), the input data (e.g. values that are incorrect, out of range or unexpected) or the general computing environment (lack of memory, central processing unit (CPU) cycles, Direct Access Storage Device (DASD), or network throughput).

When storage space matters (no HD, memory only systems, ring buffer, etc.), a question arises as to how many trace statements should be included. Many traces result in a large amount of data, whereas less traces result in less information available for analysis.

Trace data can be limited in a variety of ways. The user may limit the number of trace points and/or the amount of state data saved at each trace point to reduce the total volume of collected data. Alternatively or additionally, a trace buffer may hold a limited volume of most recently gathered trace data, older data being overwritten as new trace data is accumulated. This is normally the case when a ring buffer is used for storing trace information, which is one way of gathering trace information.

SUMMARY

The shortcomings of the prior art are overcome and additional advantages are provided through the provision of a method which includes: operating a trace procedure, the trace procedure tracing execution of a computer program and a trace buffer, the computer program using different callable modules, wherein a program stack is used to store trace buffer information and an error state, and wherein the modules include calls of the trace procedure. The operating includes: (i) when entering execution of a module, storing the current write position of the trace buffer and storing a cleared error flag in the current frame of the stack; (ii) in case of an error condition during execution of the computer program, setting the error flag in the current frame of the stack; and (iii) when leaving execution of a module: determining if the error flag is set, and if it is not set, then rewinding the trace buffer to the write position stored in the current frame of the stack; and deleting the current write position of the trace buffer and the error flag from the stack.

In another aspect, a computer program product for operating a trace procedure is provided. The computer program product includes a computer-readable storage medium readable by a processing a circuit and storing instructions for execution by the processing circuit for performing a method. The method includes: operating a trace procedure, the trace procedure tracing execution of a computer program in a trace buffer, the computer program using different callable modules, wherein a program stack is used to store trace buffer information and an error state, and wherein the modules comprise calls of the trace procedure. The operating includes: (i) when entering execution of a module, storing the current write position of the trace buffer and storing a cleared error flag in the current frame of the stack; (ii) in the case of an error condition during execution of the computer program, setting the error flag in the current frame of the stack; and (iii) when leaving execution of a module: determining if the error flag is set, and if it is not set, then rewinding the trace buffer to the write position stored in the current frame of the stack; and deleting the current write position of the trace buffer and the error flag from the stack.

In a further aspect, a system is provided which includes a memory, and a processor in communications with the memory, wherein the system performs a method. The method includes: operating a trace procedure, the trace procedure tracing execution of a computer program in a trace buffer, the computer program using different callable modules, wherein a program stack is used to store trace buffer information and an error state, and wherein the modules comprise calls of the trace procedure. The operating includes: (i) when entering execution of a module, storing the current write position of the trace buffer and storing a cleared error flag in the current frame of the stack; (ii) in case of an error condition during execution of the computer program, setting the error flag in the current frame of the stack; and (iii) when leaving execution of a module: determining if the error flag is set, and if it is not set, then rewinding the trace buffer to the write position stored in the current frame of the stack; and deleting the current write position of the trace buffer and the error flag from the stack.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein:

FIG. 3a is the program code of FIG. 1a in a successive state after returning from module XYZ;

FIG. 3b is a further snapshot of the program stack and the trace buffer of FIG. 1b in a next step after returning from module XYZ;

DETAILED DESCRIPTION

Figure 1A:
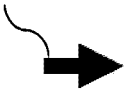
FIG. 1a depicts program code for calling a first module ABC, which is calling a second module XYZ according to an embodiment of the invention in an initial state.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for operating a trace procedure, which traces execution of a computer program in a trace buffer. The illustrative embodiments are sometimes described herein using particular technologies only as an example for the clarity of the description. The illustrative embodiments may be used for operating a trace procedure, which traces execution of a computer program in a trace buffer, the computer program using different callable modules, wherein a program stack is used to store trace buffer information, and wherein the modules comprise calls of the trace procedure.

According to an embodiment of the invention a stack based tracing is implemented to log an execution flow of a computer program. The current write position in the trace buffer and the error flag are managed by an object on the stack in the local scope or context, similar to local variables. A trace buffer is used like a stack, i.e. information is stored on last in first out basis. Such a trace buffer is used such that the information written as a last item on the buffer is deleted as a first information. The trace buffer thus is able to grow and shrink, just according to the trace information written to the buffer. If no errors occur during module execution the trace information is deleted from the buffer and only if errors occurred this trace information is kept for further use, such as for analyzing reasons for the error occurring.

Stack based tracing is used, where the current write position in the trace buffer and the error flag are managed on a stack similar to local variables. A program stack is a common tool used in data processing systems, where data are stored on a last in first out basis.

Trace statements are included into the program code and the information is print out during the program flow. When the execution of the computer program leaves a local scope and no error occurred, the local executed trace statements are deleted or replaced by a summary trace. Advantages of the inventive method are that successful program execution is logged with less amount of data. On the other hand the execution path of a failure is traced with a high amount of detailed data.

In FIGS. 1*a* to 4*b* a sequence of writing tracing information to a program stack according to the inventive method is depicted in detail for a case of no errors occurring during program execution. In particular, in FIGS. 1*a* to 4*a* a program code for calling a first module ABC, which is calling a second module XYZ according to an embodiment of the invention is depicted in successive states of program execution. The current program state is indicated with a program pointer 18. The current state of a program stack 10 and a trace buffer 12 is depicted in FIGS. 1*b* to 4*b* according to the successive states of program execution.

Figure 1B:
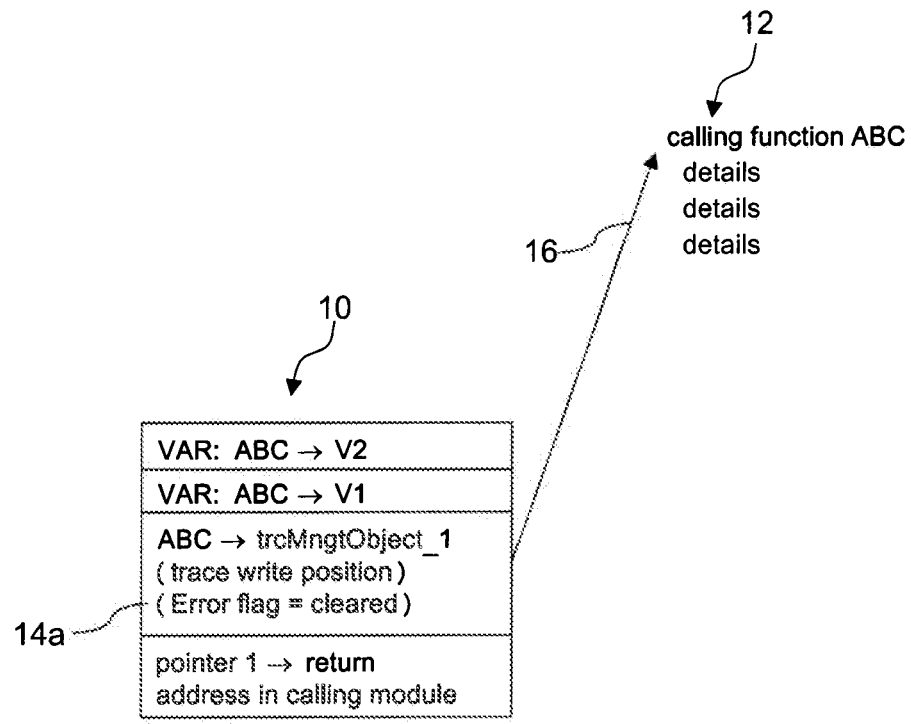
FIG. 1b is a current snapshot of a program stack and a trace buffer according to an embodiment of the invention, after calling the first module ABC.

FIG. 1*b* depicts a current snapshot of a program stack 10 and a trace buffer 12 according to an embodiment of the invention, after calling the first program module ABC, as depicted in the program code in FIG. 1*a*. The callable module may be a procedure or a function of the computer program and may comprise entering a new context scope in the stack 10.

The inventive method for operating a trace procedure, which traces execution of a computer program in a trace buffer 12, where the computer program is using different callable modules, uses a program stack 10 to store trace buffer information. The modules may comprise calls of the trace procedure. When execution of a module is entered, the current write position 16 of the trace buffer 12 is stored on the stack 10 and an error flag 14 on the stack 10 is created and cleared (set to false). In case of an error condition during execution of the computer program, the error flag 14 is set on the stack 10. In the figures, the error flag is renamed to 14*a* and 14*b* to illustrate that there are separate error flags in each stack frame and to be able to reference specific error flags. When execution of a module is left, it is first determined if the error flag 14 is set, and if it is not set, then the trace buffer 12 is rewound to the write position 16 stored on the stack 10. Then the current write position 16 of the trace buffer 12 and the error flag 14 are deleted from the stack 10.

In case of an object oriented computer program code, the method comprises, when entering execution of a module, storing the current write position 16 of the trace buffer 12 into a trace management object, which is a convenient way of combining data and related methods on these data. When leaving execution of the module, it is determined if the error flag 14 is set, and if it is not set, then the trace buffer 12 is rewound to the write position 16 stored in the trace management object. Next the trace management object is removed from the stack 10. The trace management object is able to record states. It is also possible to communicate with the trace management object and as the object contains methods it is able to perform actions in case of an error occurring during module execution as well as in case there is no error occurring.

In case of a procedural computer program code, the method comprises contrarily, when entering execution of the module, storing the current write position 16 of the trace buffer 12 on the stack 10. Then an error flag 14 is created on the stack 10 and the error flag 14 is cleared. Further, when leaving execution of a module, it is determined if the error flag 14 is set, and if it is not set, then the write position 16 of the trace buffer 12 stored on the stack 10 is restored. Finally the stack 10 is rolled back automatically, such that the trace buffer write position 16 and the error flag 14 are removed from the stack.

Trace output of the computer program may be managed by an object on the stack 10. Thus trace output is not static serial, but may be dynamically growing and shrinking dependent on the stack state and content. Advantageously the object can be communicated with and the object further contains methods to be able to perform actions in case of an error occurring during module execution as well as in case there is no error occurring.

For object oriented program code, which is the case in FIG. 1, a trace management object (trcMngtObject_1) is used containing the write position 16 of the trace buffer 12 and the error flag 14 which is cleared when the object is created. This is a convenient way of storing data, such as the write position 16 of the trace buffer 12 combined with the method of clearing the error flag 14.

In FIG. 1a, a function ABC is executed by a computer program, represented by an address pointer 1 on the stack 10, which is shown together with the trace buffer 12 in FIG. 1b. The pointer 1 is always representing the return address in the calling module, in the embodiment shown module ABC. Function ABC uses a trace management object (trcMngtObject_1) to store the current write position 16 of the trace buffer 12. Variables V1 and V2 are used by the function ABC and stored on top of the stack 10. Calling function ABC produces a number of detail information (traces) during execution, written into the trace buffer 12. The current program state is indicated with the program pointer 18. The error flag 14a is cleared as shown in FIG. 1b.

Figures 2A, 2B:
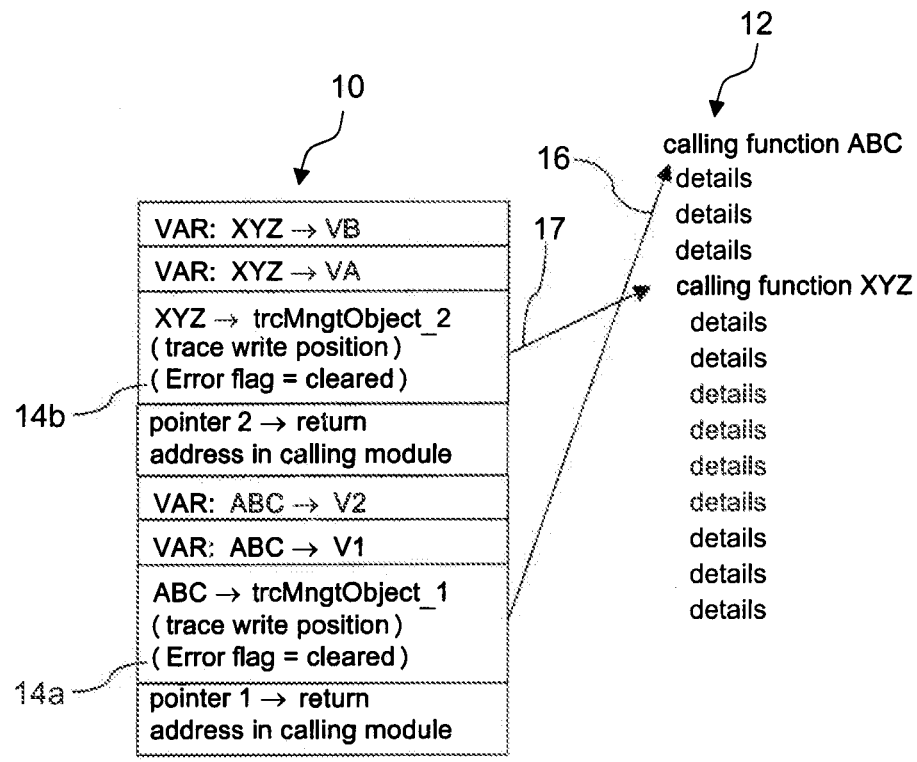
FIG. 2a depicts the program code of FIG. 1a in a next state after calling the second module XYZ.
FIG. 2b is a further snapshot of the program stack and the trace buffer of FIG. 1b after calling the second module XYZ.

Next, in FIG. 2b, a further snapshot of the program stack 10 and the trace buffer 12 of FIG. 1b is depicted after calling the second module, namely a function XYZ called by the function ABC, as depicted by the program code in FIG. 2a. A second trace management object (trcMngtObject_2) is used to store the current write position 17. Variables VA and VB are used by the function XYZ and stored on top of the stack 10, which means the stack 10 is growing according to the information written to the stack 10. Calling function XYZ produces a number of detail information (traces) during execution, written into the trace buffer 12. Error flag 14b is cleared by the second trace management object. The pointer 2 is representing the return address in the calling module, in the embodiment shown module ABC.

Function XYZ terminates successful, which is shown in FIG. 3b by a further snapshot of the program stack 10 and trace buffer 12 of FIGS. 1a & 1b in a next step after returning from module XYZ, as depicted by the program code in FIG. 3a. The stack 10 is cleared from the variables and objects of calling function XYZ, thus shrinking the stack 10 after terminating function XYZ. For object oriented program code, when leaving execution of a module, the trace management object is automatically deleted and the trace buffer write position is rewound. In the trace buffer 12 only the information that function XYZ was executed successful is kept. Error flag 14a is still cleared as no error occurred during execution of the module XYZ.

Figures 4A, 4B:
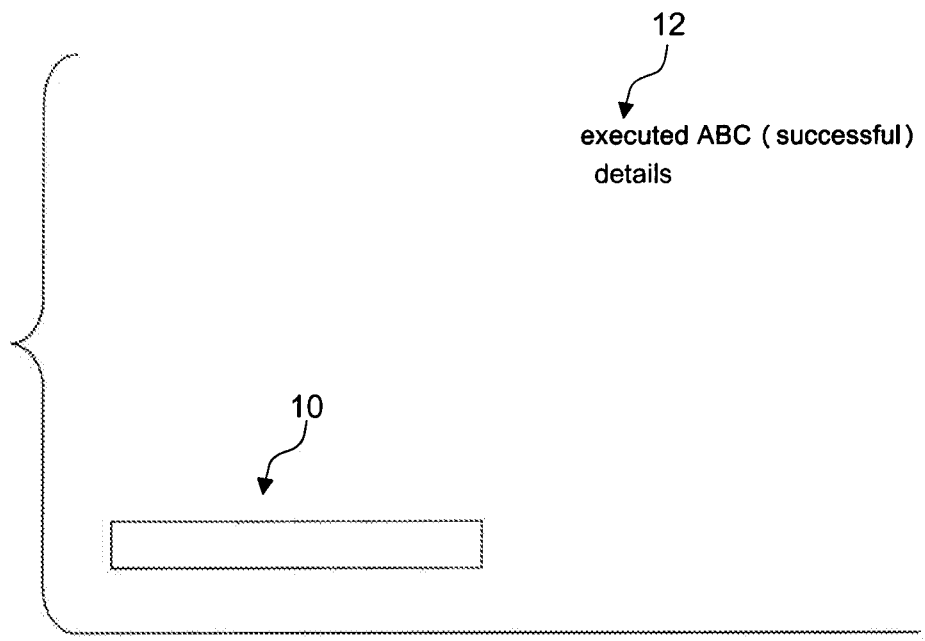
FIG. 4a depicts the program code of FIG. 1a in a successive state after returning from module ABC without an error.
FIG. 4b is a further snapshot of the program stack and the trace buffer of FIG. 1b after returning from module ABC without an error.

Next, in FIG. 4b a further snapshot of the program stack 10 and the trace buffer 12 of FIG. 1 after returning from module ABC without an error is shown, as depicted by the program code in FIG. 4a. Function ABC terminated also successful without an error. So the stack 10 is cleared from all variables and objects of function ABC and only the information that function ABC was executed successful is kept in the trace buffer 12.

In FIGS. 5b to 9b a sequence of writing tracing meta information to a program stack according to the inventive method is depicted in detail for a case with errors occurring during program execution. The corresponding program code is shown in FIGS. 5a to 9a.

Figures 5A, 5B:
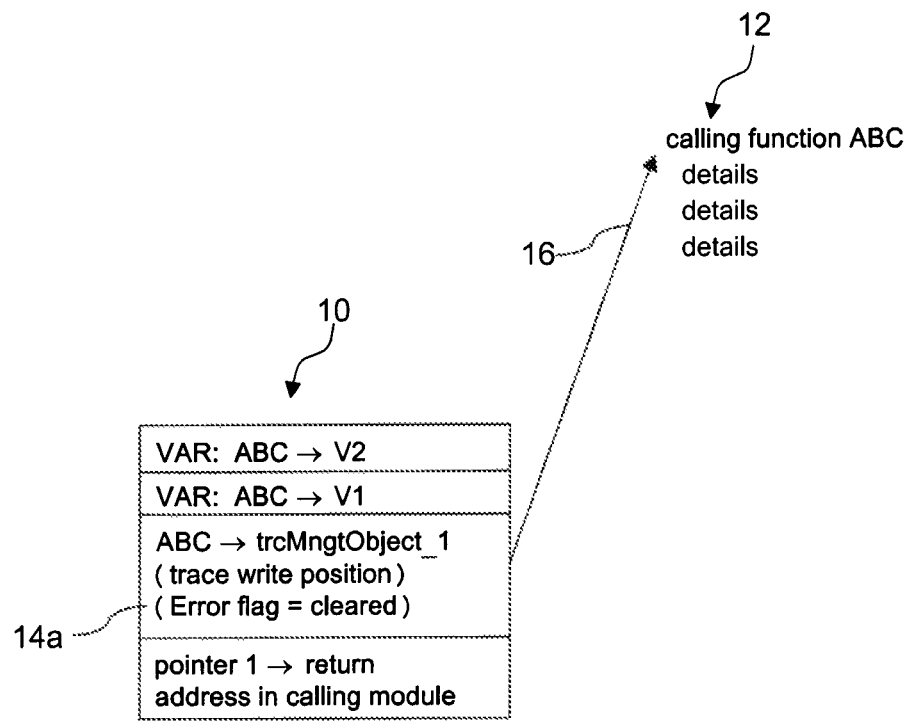
FIG. 5a is a program code for calling a first module ABC, which is calling a second module XYZ according to an embodiment of the invention in an initial state.
FIG. 5b is a current snapshot of a program stack and a trace buffer according to an embodiment of the invention, after calling the first module ABC.

FIG. 5b depicts a current snapshot of the program stack 10 and the trace buffer 12 according to an embodiment of the invention, after calling a first module ABC by a computer program, as depicted by the program code in FIG. 5a. As in FIGS. 1a, 1b, function ABC is executed by the computer program. The pointer 1 is representing the return address in the calling module, in the embodiment shown module ABC. Function ABC uses the trace management object (trcMngtObject_1) to store the current write position 16 of the trace buffer 12. Variables V1 and V2 are used by the function ABC and stored on top of the stack 10. Calling function ABC produces a number of detailed information (traces) during execution, written into the trace buffer 12. The current program state is indicated with the program pointer 18. The error flag 14a is cleared as shown in FIG. 5b.

Figures 6A, 6B:
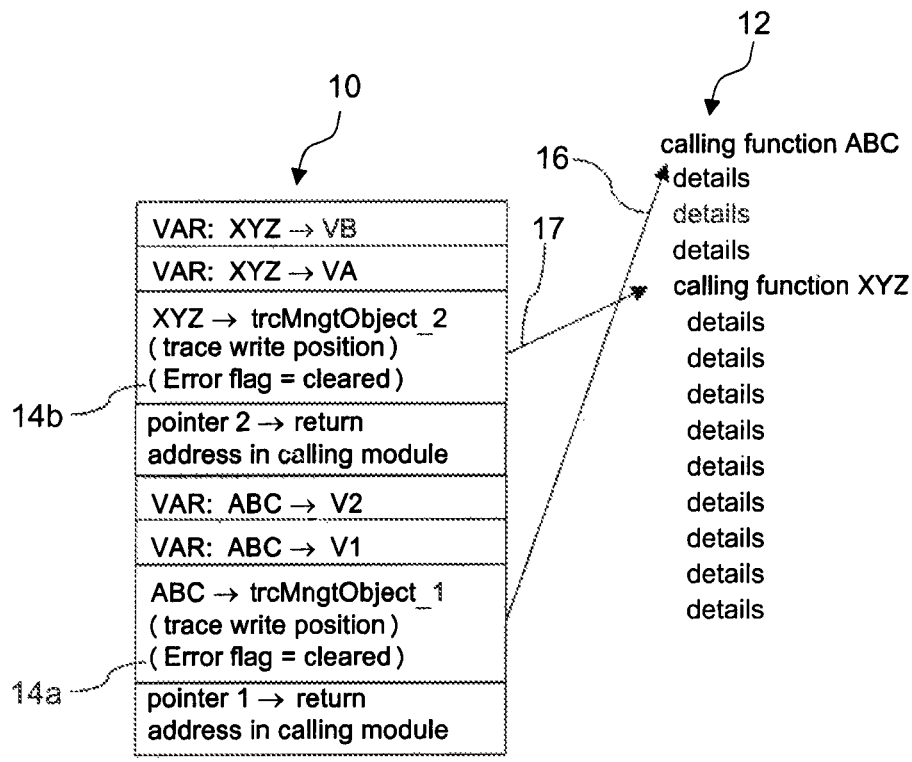
FIG. 6*a* depicts the program code of FIG. 5*a* in a next state after calling the second module XYZ.
FIG. 6*b* is a further snapshot of the program stack and the trace buffer of FIG. 5*b* after calling the second module XYZ.

In FIG. 6b a further snapshot of the program stack 10 and the trace buffer 12 of FIG. 5b is shown after calling a second module XYZ by the function ABC, as depicted by the program code in FIG. 6a. The second trace management object (trcMngtObject_2) is used to store the current write position 17. Variables VA and VB are used by the function XYZ and stored on top of the stack 10, the stack 10 thus growing again according to the information written to the stack 10. Calling function XYZ produces a number of detail information (traces) during execution, written into the trace buffer 12. Error flag 14b is cleared by the second trace management object. The pointer 2 is representing the return address in the calling module, in the embodiment shown module ABC.

Figures 7A, 7B:
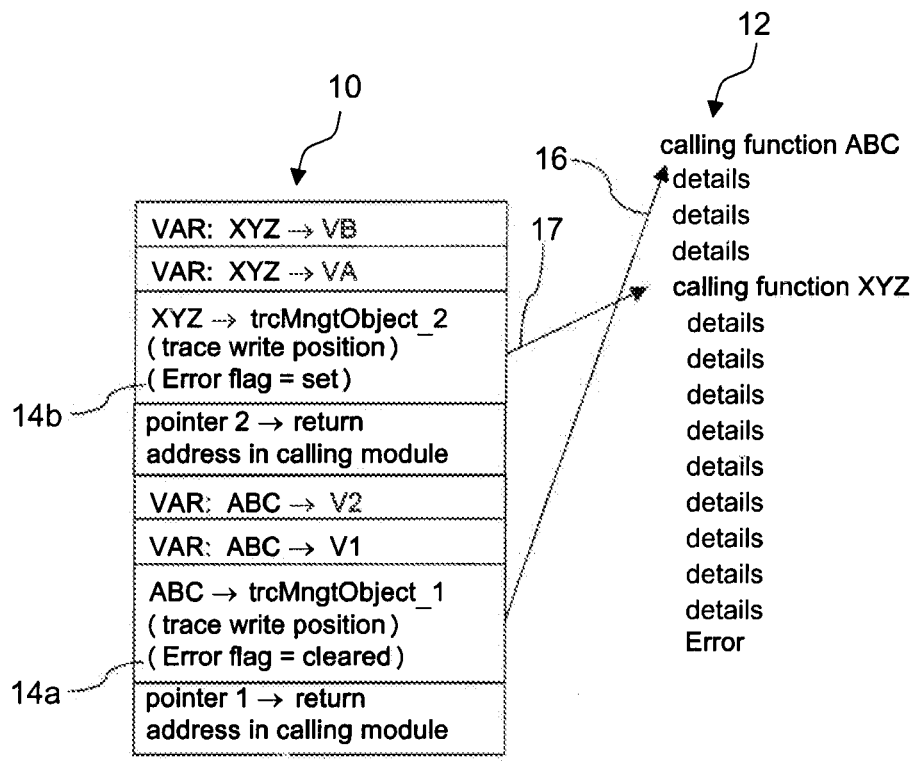
FIG. 7*a* depicts the program code of FIG. 5*a* in a successive state after occurrence of an error while executing module XYZ.
FIG. 7*b* is a further snapshot of the program stack and the trace buffer of FIG. 5*b* in a next step after occurrence of an error while executing module XYZ.

In this case, executing function XYZ results in an error occurring during execution, reported by the error flag 14b on the trace buffer 12, which is depicted in FIG. 7b by a further snapshot of the program stack 10 and the trace buffer 12 of FIG. 5b in a next step after occurrence of the error while executing module XYZ, as depicted by the program code in FIG. 7a. The trace management object (trcMngtObject_2) not only stores the current write position 17, but also the error flag 14b.

Figures 8A, 8B:
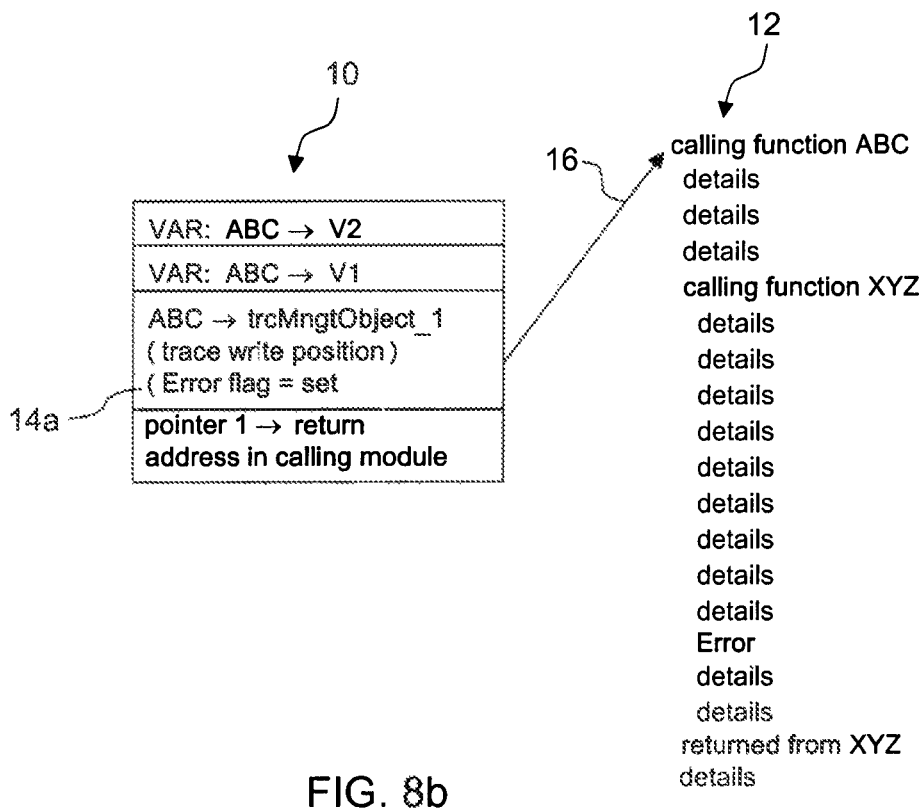
FIG. 8*a* depicts the program code of FIG. 5*a* in a successive state after returning from the erroneous module XYZ.
FIG. 8*b* is a further snapshot of the program stack and the trace buffer of FIG. 5*b* after returning from the erroneous module XYZ.

Next, in FIG. 8b a further snapshot of the program stack 10 and the trace buffer 12 of FIG. 5b is depicted after returning from the erroneous module XYZ, as depicted by the program code in FIG. 8a. The variables and objects resulting from execution of function XYZ are cleared from the stack 10, but in this case the information from calling and executing function XYZ is kept in the trace buffer 12. An error is returned as a result of the execution of XYZ and is used by module ABC to decide if the error flag 14a in the current frame of the stack should be set. This information may further be used for analyzing reasons for occurrence of the error during execution of the function XYZ.

Figures 9A, 9B:
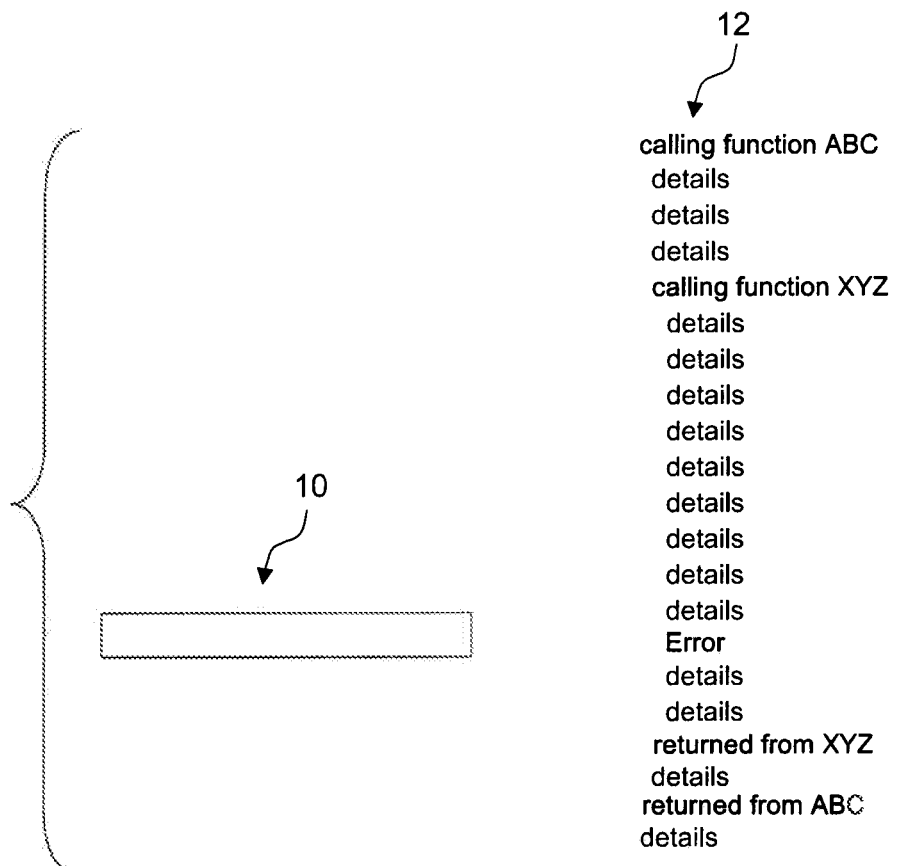
FIG. 9*a* depicts the program code of FIG. 5*a* in a successive state after returning with an error from module ABC.
FIG. 9*b* is a further snapshot of the program stack and the trace buffer of FIG. 5*b* after returning with an error from module ABC.

In FIG. 9b a further snapshot of the program stack 10 and the trace buffer 12 of FIG. 5b is depicted after returning with the error from module ABC, as depicted by the program code in FIG. 9a. The stack 10 is cleared from variables and objects of function ABC, but information stored during execution and after returning of functions ABC and XYZ are kept in the trace buffer 12 for further error analysis. Thus, when leaving execution of module ABC and the error flag 14a is set, the write position 16 of the trace buffer 12 remains unchanged.

Figure 10:
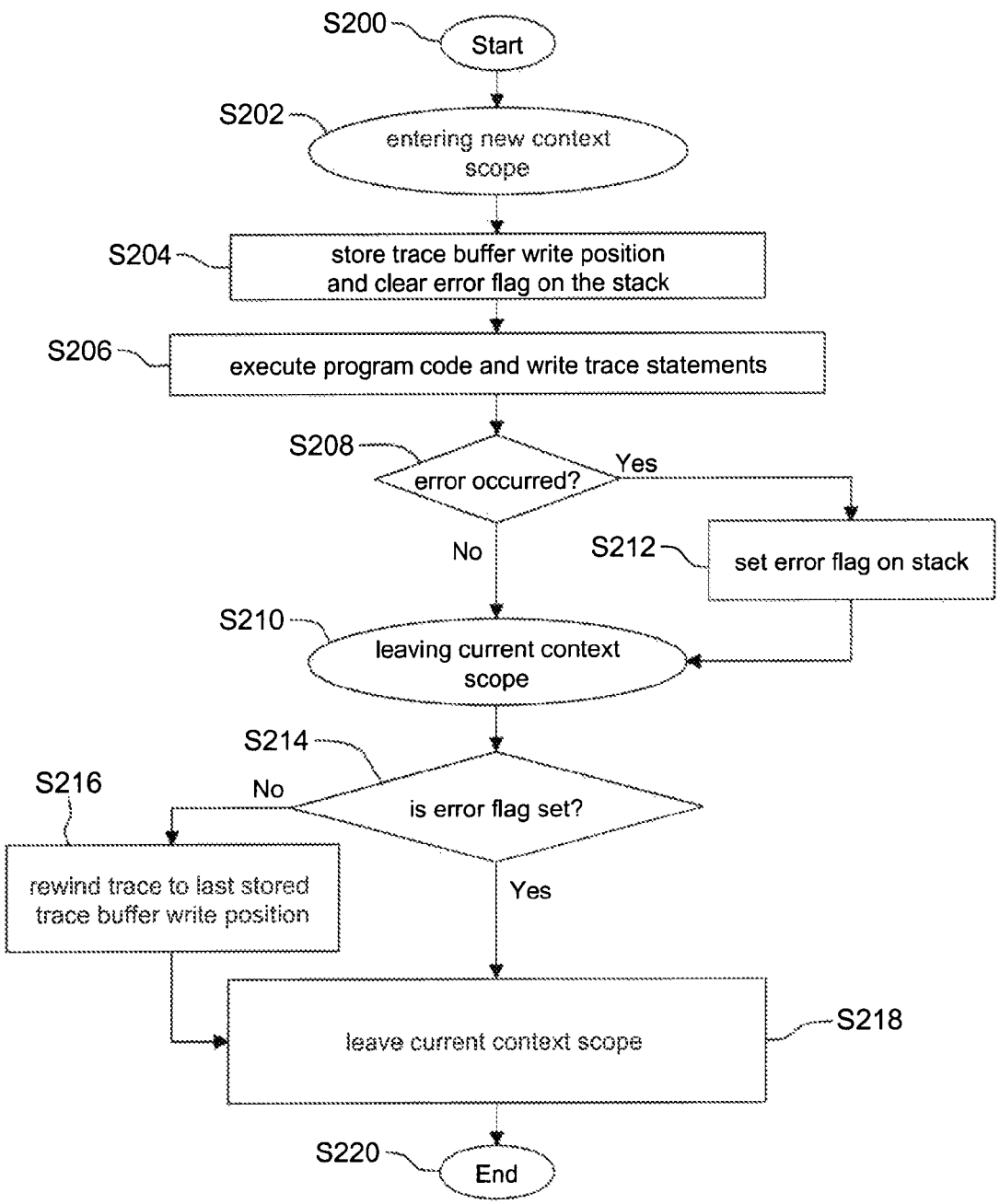
FIG. 10 is a flowchart of an exemplary process of a method for operating a trace buffer using a program stack according to an embodiment of the invention.

In FIG. 10, a flowchart of an exemplary process of the inventive method for operating a trace buffer 12 using a program stack 10 according to an embodiment of the invention is depicted. The method comprises after start of the program execution in step S200, entering a new context scope, which may be calling a module, function or procedure in step S202. For object oriented design a trace management object is created on the stack and the trace buffer write position (address pointer) is stored into this trace management object. For procedural design the trace buffer write position is stored on the stack and an error flag is created on the stack and cleared.

Then, a trace buffer write position is stored and an error flag on the stack cleared in step S204. The program code is executed and trace statements written on the trace buffer in step S206. If an error occurred in step S208, an error flag is set on the stack for procedural design and in the trace management object, respectively, for the object oriented design, in step S212 before leaving the context in step S210. For object oriented design a trace management object is used containing the trace buffer write position and the error flag is cleared. Next, in step S214, the error flag is evaluated in the stack or in the trace management object, respectively, before the current context scope is left, performing corresponding actions dependent on this error flag. In the error status there is no change in the trace buffer write position. In the case of successfully terminating the current context scope the trace buffer write position stored on the stack or in the trace management object is restored.

Leaving the current context scope then means the stack is rewound automatically removing the trace buffer write position and error flag from the stack. For object oriented design the trace management object is deleted automatically from the stack.

To summarize, a method is proposed herein for operating a trace procedure, which traces execution of a computer program in a trace buffer, the computer program using different callable modules. A program stack is used to store trace buffer information and an error flag, and the modules comprise calls of the trace procedure. The method comprises: (i) when entering execution of a module, storing the current write position of the trace buffer and storing a cleared error flag in the current frame of the stack; (ii) in case of an error condition during execution of the computer program, setting the error flag in the current frame of the stack; and (iii) when leaving execution of a module—determining if the error flag is set, and if it is not set, then rewinding the trace buffer to the write position stored in the current frame of the stack; and—deleting the current write position of the trace buffer and the error flag from the stack.

Stack based tracing is used, where all trace statements in the program code are managed on a stack and managed in the local scope similar to local variables. A program stack is a very common tool used in data processing systems, where data are stored on a last in first out basis. Trace statements are included into the program code and the information of details currently executed in the program code is print out during the program flow. The output could be written into a memory buffer. A marker to the current write position is stored in the current stack frame, each time a new local scope or context is entered. When the scope is left, and no error occurred, the write position could be set to the last stored marker on the stack (rewound). In this manner the last executed trace statements could be deleted or replaced by a summary trace. This means the tracing output is growing and decreasing like a stack for local variables.

Further a favorable computer program product is proposed for operating a trace procedure, which traces execution of a computer program in a trace buffer, the computer program using different callable modules. A program stack is used to store trace buffer information and an error flag, and the modules comprise calls of the trace procedure. The method comprises: (i) when entering execution of a module, storing the current write position of the trace buffer and storing a cleared error flag in the current frame of the stack; (ii) in case of an error condition during execution of the computer program, setting the error flag in the current frame of the stack; and (iii) when leaving execution of a module—determining if the error flag is set, and if it is not set, then rewinding the trace buffer to the write position stored in the current frame of the stack; and—deleting the current write position of the trace buffer and the error flag from the stack.

Further, a data processing system for execution of a data processing program is proposed, comprising computer readable program instructions for performing a method described above.

Figure 11:
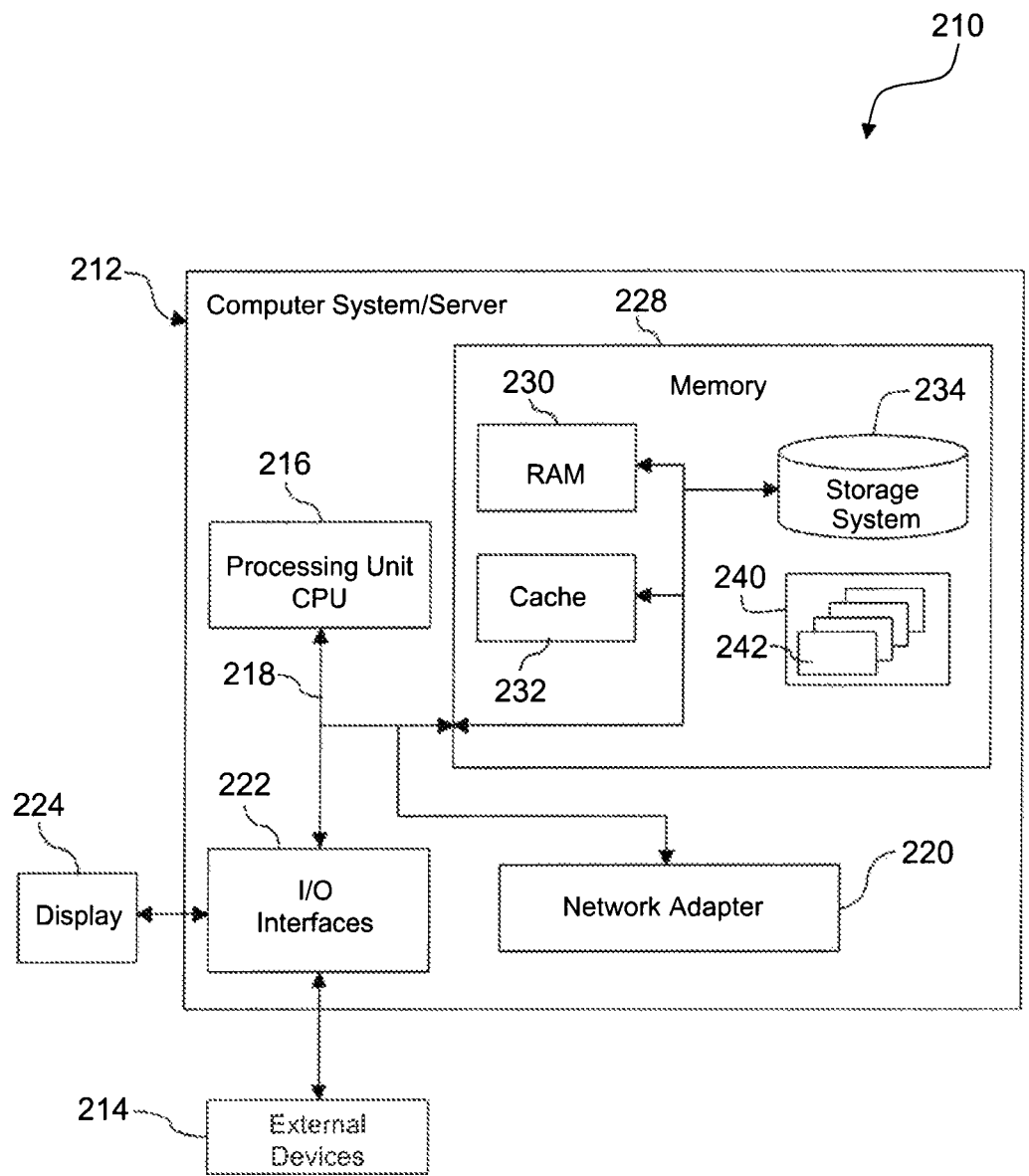
FIG. 11 depicts an example embodiment of a data processing system for executing a method according to the invention.

Referring now to FIG. 11, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for operating a trace procedure, the computer program product comprising:
    a computer-readable storage medium readable by a processing circuit and storing instructions for execution by the processing circuit for performing a method comprising:
        operating a trace procedure, the trace procedure tracing execution of a computer program in a trace buffer using a program stack, the computer program using different callable modules, wherein the program stack is used to store trace buffer information and an error state, and wherein the modules comprise calls of the trace procedure, the operating comprising:
            (i) when entering execution of a module, storing in a current frame of the program stack the current write position of the trace buffer and storing an associated error flag in the current frame of the stack, the associated error flag being stored as a cleared error flag;
            (ii) in case of an error condition during execution of the computer program, setting the associated error flag in the current frame of the stack; and
            (iii) when leaving execution of a module:
                determining if the associated error flag in the current frame of the stack is set, and if it is not set, then rewinding the trace buffer to the write position stored in the current frame of the stack; and
                rolling back the stack by deleting the current write position of the trace buffer and the associated error flag from the stack where the associated error flag in the current frame of the stack is not set.

2. The computer program product of claim 1, wherein when leaving execution of a module and the associated error flag is set, the write position of the trace buffer remains unchanged.

3. The computer program product of claim 1, wherein where the computer program comprises an object oriented computer program code, the operating further comprises:
    (i) when entering execution of a module, storing the current write position of the trace buffer into a trace management object; and
    (ii) when leaving execution of a module:
        determining if the associated error flag is set, and if it is not set, then rewinding the trace buffer to the write position stored in the trace management object; and
        removing the trace management object from the stack.

4. The computer program product of claim 1, wherein where the computer program comprises a procedural computer program code, the operating further comprises:
    (i) when entering execution of a module, storing the current write position of the trace buffer on the stack and creating an associated error flag on the stack and clearing the associated error flag; and
    (ii) when leaving execution of a module:
        determining if the associated error flag is set, and if it is not set, then restoring the write position of the trace buffer stored on the stack; and
        removing the trace buffer write position and the associated error flag from the stack.

5. The computer program product of claim 1, wherein where the computer program comprises object oriented program code, a trace management object is used containing the write position of the trace buffer and methods for clearing and setting of the associated error flag.

6. The computer program product of claim 1, wherein where the computer program comprises object oriented program code, when leaving execution of a module, the trace management object is automatically deleted.

7. The computer program product of claim 1, wherein the callable module is a procedure or a function of the computer program.

8. A system comprising:

a memory; and a processor in communications with the memory, wherein the system performs a method, the method comprising:

operating a trace procedure, the trace procedure tracing execution of a computer program in a trace buffer using a program stack, the computer program using different callable modules, wherein the program stack is used to store trace buffer information and an error state, and wherein the modules comprise calls of the trace procedure, the operating comprising:

(i) when entering execution of a module, storing in a current frame of the program stack the current write position of the trace buffer and storing an associated error flag in the current frame of the stack, the associated error flag being stored as a cleared error flag;

(ii) in case of an error condition during execution of the computer program, setting the associated error flag in the current frame of the stack; and (iii) when leaving execution of a module:

determining if the associated error flag in the current frame of the stack is set, and if it is not set, then rewinding the trace buffer to the write position stored in the current frame of the stack; and rolling back the stack by deleting the current write position of the trace buffer and the associated error flag from the stack where the associated error flag in the current frame of the stack is not set.

9. The system of claim 8, wherein when leaving execution of a module and the associated error flag is set, the write position of the trace buffer remains unchanged.

10. The system of claim 8, wherein where the computer program comprises an object oriented computer program code, the operating further comprises:

(i) when entering execution of a module, storing the current write position of the trace buffer into a trace management object; and (ii) when leaving execution of a module:

determining if the error associated flag is set, and if it is not set, then rewinding the trace buffer to the write position stored in the trace management object; and removing the trace management object from the stack.

* * * * *